United States Patent
Schwenkbeck et al.

(10) Patent No.: US 12,117,161 B2
(45) Date of Patent: Oct. 15, 2024

(54) OPTICAL ELEMENT FOR A LAMP AND LAMP HAVING SUCH AN OPTICAL ELEMENT

(71) Applicant: OSRAM GmbH, Munich (DE)

(72) Inventors: Marc Schwenkbeck, Winnenden (DE); Roman Liske, Mögglingen (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 17/909,714

(22) PCT Filed: Mar. 5, 2021

(86) PCT No.: PCT/EP2021/055591
§ 371 (c)(1),
(2) Date: Sep. 6, 2022

(87) PCT Pub. No.: WO2021/176055
PCT Pub. Date: Sep. 10, 2021

(65) Prior Publication Data
US 2024/0210009 A1    Jun. 27, 2024

(30) Foreign Application Priority Data
Mar. 6, 2020  (DE) .................. 10 2020 202 923.7

(51) Int. Cl.
*F21V 5/04*    (2006.01)
*F21S 41/143*  (2018.01)
(Continued)

(52) U.S. Cl.
CPC ............ *F21V 5/045* (2013.01); *F21S 41/143* (2018.01); *F21S 41/275* (2018.01);
(Continued)

(58) Field of Classification Search
CPC ...... F21V 5/045; F21V 7/0083; F21S 41/275; F21S 41/143; F21S 41/321; G02B 1/041; F21Y 2105/18
See application file for complete search history.

(56) References Cited

U.S. PATENT DOCUMENTS

| 5,945,916 A | 8/1999 | Collot |
| 2008/0037947 A1* | 2/2008 | Chao .................... G02B 3/0043 385/146 |

(Continued)

FOREIGN PATENT DOCUMENTS

| CN | 106016177 A | 10/2016 |
| DE | 19704267 A | 9/1997 |

(Continued)

OTHER PUBLICATIONS

Oda, Light Ray Control Unit, 2013, JP5295721B2, https://worldwide.espacenet.com/patent/search/family/042301654/publication/JP5295721B2?q=pn%3DJP5295721B2 (Year: 2013).*

*Primary Examiner* — Tracie Y Green
*Assistant Examiner* — Michael Chiang
(74) *Attorney, Agent, or Firm* — Slater Matsil, LLP

(57) ABSTRACT

In an embodiment an optical element for a lamp includes a line optic having a symmetrical groove structure formed from waves, wherein the groove structure varies continuously starting from a center of symmetry in at least one propagation direction of the groove structure.

18 Claims, 3 Drawing Sheets

(51) Int. Cl.
*F21S 41/275* (2018.01)
*F21S 41/32* (2018.01)
*F21V 7/00* (2006.01)
*G02B 1/04* (2006.01)
*F21Y 105/18* (2016.01)
*F21Y 115/10* (2016.01)

(52) U.S. Cl.
CPC .......... *F21S 41/321* (2018.01); *F21V 7/0083* (2013.01); *G02B 1/041* (2013.01); *F21Y 2105/18* (2016.08); *F21Y 2115/10* (2016.08)

(56) References Cited

U.S. PATENT DOCUMENTS

2012/0044682 A1* 2/2012 Allen ................. G02B 27/0955
  362/241
2014/0313728 A1  10/2014 Stoll et al.
2017/0292682 A1* 10/2017 Sepkhanov .......... G02B 3/0068
2021/0300233 A1*  9/2021 Risthaus ............... F21S 41/275

FOREIGN PATENT DOCUMENTS

| | | |
|---|---|---|
| DE | 102004004778 A1 | 9/2005 |
| DE | 102011054228 A1 | 4/2013 |
| DE | 102012206080 A1 | 10/2013 |
| DE | 102013207242 A1 | 10/2014 |
| EP | 2587125 A2 | 5/2013 |
| JP | 5295721 B2 * | 9/2013 |
| WO | 2013153212 A1 | 10/2013 |

* cited by examiner

OPTICAL ELEMENT FOR A LAMP AND LAMP HAVING SUCH AN OPTICAL ELEMENT

CROSS-REFERENCE TO RELATED APPLICATIONS

This application is a national stage entry according to 35 U.S.C. § 371 of PCT Application No. PCT/EP2021/055591 filed on Mar. 5, 2021, which claims priority to German national patent application No. 10 2020 202 923.7, which has been filed on Mar. 6, 2020, and the disclosure of which is incorporated herein by reference in its entirety and for all purposes.

TECHNICAL FIELD

The present invention relates to an optical element for a lamp and to a lamp having such an optical element, and to the use thereof.

BACKGROUND

In many cases, lamps are used with optical elements that can be used to shape the light emitted from light sources to suit the specific application. However, especially in the field of working lamps or auxiliary lamps for vehicles, the known lamps only have a limited illumination width, for example a maximum beam range of +/−40°. The suitability of these lamps for wide illumination at greater distances, as would be desirable for working lamps or head lamps of a vehicle, is thus only limited. Additionally, the aforementioned lamps, or the optical elements used herein, do not include any spatially resolved beam shaping properties, so that a flexibility in design of illumination is limited.

Document DE 197 04 267 A1 discloses a signal lamp for motor vehicles having means for the scattering of light. It comprises a light source and a collecting mirror as well as an optical plate for generating a signal light beam according to predetermined photometry in cooperation with the collecting mirror. The optical disk has grooves extending along a direction in a central zone and in peripheral zones, respectively. The grooves of the central zone are cylindrical with constant diameter in the axial direction of the grooves. The grooves of the peripheral zones have a diameter that progressively increases from the inside to the associated edge parallel to the orientation of the grooves, or along the grooves respectively, i.e., perpendicular to a direction of propagation in which the grooves forming the groove structure are respectively aligned. In combination with a corresponding groove structure on the collecting mirror, this is considered to result in a reduced installation space requirement.

Document DE 10 2012 206 080 A1 discloses a lighting device for street lighting having a support, a light source arrangement and an optical element which is designed as an extruded profile, whereby a surface structure with different decollimation strengths in respective regions of the optical element is created by a microlens structure such as a cylindrical lens, prisms or a wave structure. A central region of the optical element thereby has a greater decollimation strength than the two outer areas surrounding it.

Document DE 10 2013 207 242 A1 discloses an arrangement with a light-emitting diode and a conversion element as well as a lens positioned above them. The lens has a wave structure in a central region and a Fresnel structure in a peripheral region, which serves to focus and shape the beam emitted by the conversion element. The wave structure includes a concave annular region in the center and a convex annular region surrounding the concave annular region, both of which serve to deflect light incident from the outside away from the conversion element to an outside region.

Document DE 10 2004 004 778 A1 discloses a light-emitting diode illumination module and a radiation-shaping optical device for a such light-emitting diode illumination module.

SUMMARY

Embodiments provide an optical element for a lamp, in particular a working lamp or auxiliary lamp of a vehicle, and a corresponding lamp having such an optical element, which enable an improved illumination specific to the respective application.

The starting point is an optical element for a lamp, whereby the optical element is designed as a line optic with a symmetrical groove structure formed from waves.

According to embodiments, the groove structure varies continuously starting from a center of symmetry in at least one direction of propagation of the groove structure. The continuous variation can be derived mathematically and can thus be described as a function.

The term line optics in this context refers to the formation of a line-shaped beam formation in the direction of propagation of the waves. The radiation is perpendicular to the base surface of the waves or groove structure. By a rotationally symmetrical formation of the wave structure, as this will described below, line-shaped projections are imaged for each angle, so that the illumination can be formed circularly as a whole. A corresponding optical element is still understood as a line optic with regard to its beam shaping in the propagation direction of the waves. The optical element can comprise further functionalities in addition to a line optics, but at least be formed by the line optics as well.

The center of symmetry can be formed as a point of symmetry or axis of symmetry at which the groove structure is imaged on itself by reflection in at least one propagation direction. As far as the groove structure has several directions of propagation, the continuous variation may as well be provided in all directions of propagation. In this context, the propagation direction of the groove structure is understood to be the direction or directions in which the waves forming the groove structure respectively line up.

By continuously varying the groove structure in at least one propagation direction, the beam shaping property of the optical element can be changed in a spatially resolved manner to widen the overall illumination. The spatial resolution is clearly visible in the near field and increasingly maps the overall illumination in the far field. On the other hand, this can also make it possible to adapt to a changed irradiation characteristic. The symmetrical variation may support symmetrical illumination in preferred directions. Illumination is understood here and also in the following as an intensity distribution exceeding a predetermined value. The predetermined value of the intensity corresponds to an application-specific minimum value, for example to an intensity at a working distance, for example an intensity at a distance of 25 m for working lamps or auxiliary lamps of vehicles.

In one embodiment, the wave spacing of the waves in the at least one direction of propagation of the groove structure varies continuously.

By continuously reducing the wave spacings, the illumination can be increased with regard to its geometric extension in the direction of propagation of the waves compared to constant wave spacings. This may be utilized in a particularly advantageous manner for working lamps or auxiliary lamps of vehicles, for example in a working range of about 25 m.

Alternatively, the illumination in terms of its geometric extension in the direction of propagation may be reduced by continuously increasing the mutual wave spacings compared to constant wave spacings. This can be utilized to increase the intensity of the illumination in a central area.

A continuous increase of the wave spacings with increasing distance from the center of symmetry may result, for example, in larger radii and smaller slopes of the waves. As a result, the line optics exert decreasing influence on the radiation characteristics of the light sources with increasing distance from the center of symmetry. However, if the distance between the wave crests is chosen to be relatively small at the outset in the center of symmetry, an optical effect can still be achieved to widen the illumination. The deflection of the light rays is greatest at the center of symmetry and decreases toward the periphery. With a continuous reduction of the wave spacings, the deflection of the light rays is smaller in the center of symmetry and increases toward the periphery.

Alternatively or complementarily, the slopes of the waves vary continuously in the at least one direction of propagation of the groove structure.

By continuously increasing the slopes, the illumination can be increased with regard to its geometric extension in the direction of propagation of the waves compared to constant slopes. This may be utilized as an alternative or as a supplement to reducing the distances between the waves. Accordingly, this measure may also be used for working lamps or auxiliary lamps on vehicles.

Alternatively, by continuously reducing the pitches, the illumination can be reduced in the sense of its geometric extension in the direction of propagation compared to constant pitches. This can also increase the intensity of the illumination in a central area as an alternative or supplement to increasing the shaft distances.

The effects that can be achieved in this manner are analogous to those described for varying the wave spacings.

In another alternative or addition, radii of wave crests and troughs vary continuously from wave to wave of the groove structure.

By continuously reducing the radii, the illumination can be increased in terms of its geometric extension in the direction of wave propagation as compared to constant radii. This may be utilized alternatively or in addition to the reduction of the wave spacings and/or increase of the slopes. Accordingly, this measure may likewise be used for working lamps or auxiliary lamps of vehicles.

Alternatively, by continuously increasing the radii, the illumination can be reduced in terms of its geometric extension in the direction of propagation compared to constant radii. This may also increase the intensity of the illumination in a central region as an alternative or supplement to increasing the wave spacings or reducing the slopes.

The effects associated with the variation of the radii of the wave crests may also result here analogously with regard to the above explanations for the variation of the wave distances.

In a further development, the groove structure is formed as a cosine function starting from the center of symmetry in the at least one propagation direction.

In accordance with the continuous variation of the groove structure in the direction of propagation, the cosine function comprises at least one factor that varies continuously over the distance from the center of symmetry. In other words, the cosine function contains at least the corresponding distance or another quantity representing this distance in a variable manner.

By describing the groove structure starting from the center of symmetry as a cosine function, the first wave crest of the groove structure lies at the center of symmetry.

Most lamps have a vertical symmetry plane and the light sources are also designed according to this symmetry. The use of a cosine function is advantageous in this case, as it can also be mirrored on the vertical symmetry plane.

In particular, the waves are formed starting from the center of symmetry (Po) according to the function $f(x)=\cos(s*(x^p))$, where x denotes the distance from the center of symmetry (Po), p the progression and s the scaling.

Via the application of the above function, depending on the distance from the center of symmetry, both the distance of the wave crests from each other and the speed of variation of the mutual of wave crest distances with each further period are influenced, namely via the scaling s in case of the mutual distance of the wave crests and via the progression p in case of the speed of variation of the mutual distance between the wave crests.

Based on a groove structure with mutual wave crest distances decreasing from the center of symmetry, a groove structure with larger values for the scaling s will have smaller spacing compared to smaller values for the scaling s for the same value of the progression p. In other words, a groove structure with larger values for the scaling s would include more crests over the same distance.

Based on a groove structure with mutual wave crest distances decreasing from the center of symmetry, a groove structure with larger values for the progression p will have a faster variation in mutual spacings as compared to smaller values for the progression p for the same value of the scaling s. In other words, a groove structure with larger values for the progression p would also have more crests over the same distance.

In particular, the application of the above function can further support the enlargement of the illumination in the propagation direction of the waves.

In one embodiment, the progression amounts to 1.6+/−10%.

The progression p thus preferably lies in the range from 1.44 to 1.76. If the progression p falls below the value of 1.44, the variation in the wave spacing may be too small to allow the illumination to be widened significantly. For example, the extension of a line optic for working lamps or auxiliary lamps of vehicles in the direction of propagation of the groove structure is about 40 to 200 mm in total. Thus, for reasons of symmetry, the variation of the wave spacing over half the extension in each case is to arranged sufficiently fast to allow implementing a perceptible or application-specific sufficient widening of the illumination. At larger values for the progression p, i.e., at values above 1.76, the beam may expand too much, so that a sufficient illumination can no longer be achieved at the preferred working distance due to the associated reduction in intensity.

Alternatively or supplementary, the scaling amounts to 0.50+/−10%.

The scaling s thus preferably lies in the range from 0.45 to 0.55. If the scaling s falls below the value of 0.45, the distance between the crests of the waves may be too small to allow widening the illumination significantly. The above remarks regarding values of the progression p smaller than 1.44 correspond to those consequences pertaining to too small values for the scaling s. Similarly, the above remarks regarding the values of the progression exceeding 1.76 may be transferred to values for a scaling s exceeding 0.55.

For the formation of the waves starting from the center of symmetry according to the function $f(x)=\cos(s*(x^p))$, it has proven to be particularly advantageous to restrict both the values for the progression p and for the scaling s to the respective value range specified above. In this manner, in particular for working lamps or auxiliary lamps of vehicles in the far field, for example at a working distance of 25 m, an illumination of 110° can be achieved in the direction of propagation of the waves, which results from a widening of 55° on each of both sides of the center of symmetry.

In one embodiment, the groove structure is formed as a sinusoidal function starting from the center of symmetry in the at least one propagation direction.

Comparable to the cosine function, the sine function comprises at least one factor continuously changing over the distance from the center of symmetry according to the continuous change of the groove structure in the direction of propagation. In other words, the sine function also contains at least the corresponding distance or another quantity representing this distance in a variable manner.

By describing the groove structure starting from the center of symmetry as a sine function, the first wave crest of the groove structure lies outside the center of symmetry, or likewise the groove structure proceeds with a wave trough starting from the center of symmetry, respectively.

A sinusoidal function may be considered, in particular, when the distance of the light source and/or the geometric extent or size of the light source is larger than the mutual distance of the first wave crests or troughs at the center of symmetry.

The application of a sine or cosine function may also depend on the arrangement of multiple light sources or lamps behind the optics. The influence of the respective applied function on the illumination becomes smaller the more light sources are used and the smaller the distance between the light sources is.

In particular, the groove structure may be linear or rotationally symmetrical.

In the case of a linear arrangement of the groove structure, the center of symmetry is formed by an axis of symmetry. The groove structure is therefore formed in a direction of propagation that is perpendicular to the axis of symmetry. Preferably, the groove structure is point-symmetrical and/or mirror-symmetrical along its propagation direction. In such an arrangement, the line optic has in particular a rectangular shape. Alternatively, the line optics may be designed as a polygon or being round.

In contrast, a rotationally symmetrical groove structure has a symmetry point as the center of symmetry, with respect to which the groove structure is formed having point-symmetry. Accordingly, the waves of the groove structure form concentrically around the point of symmetry. In particular, the line optics in this embodiment are circular. Here, too, alternative embodiments are possible, as have been mentioned for the linear arrangement of the groove structure for the line optics.

In one embodiment, the line optic is planar at least on its side having the groove structure.

The planar design of the line optics on its side having the groove structure simplifies the optical design of the line optics, especially if the side of the line optics opposite the groove structure is also planar. With regard to the groove structure, the term "planar" refers to the fact that the groove structure lies in a flat surface.

Alternatively, the line optics may be convex at least on the side including the groove structure.

In particular, for example, in the case of a linear groove structure, the groove structure is formed convexly perpendicular to the direction of propagation of the waves. The convex curvature occurs in the direction of the side of the line optics facing away from the groove structure. The surface having the groove structure is thus curved outward. This allows a beam emerging from the groove structure through the line optics to be expanded in a direction perpendicular to the direction of propagation of the waves.

In a further alternative, the line optic may be concave at least on its side including the groove structure.

In particular, for example, in the case of a linear groove structure, the groove structure is formed concave perpendicular to the propagation direction of the waves. The concave curvature occurs in a direction opposite to the side of the line optics facing away from the groove structure. The surface including the groove structure is thus curved inward. This allows a beam emerging from the groove structure through the line optics to be focused in a direction perpendicular to the direction of wave propagation. By focusing, illumination perpendicular to the propagation direction of the waves can be reduced or increased depending on the distance to the groove structure. This can be used in an advantageous manner to achieve an illumination in the far field that is increased in this direction.

In the optical element, the line optics may be formed of polymethyl methacrylate or polycarbonate.

Polymethyl methacrylate or PMMA and polycarbonate or PC have a high availability and are flexible in terms of their processability. Alternatively, the line optics can also be made of other plastics with transmissive properties or glass, such as crown glass or flint glass.

In another aspect, a lamp having at least one optical element according to the foregoing embodiments is concerned, the lamp comprising one or more light sources capable of passing radiation through the line optics from a side opposite to the groove structure.

Preferably, LEDs are used as light sources, which can be direct-emitting or phosphor-converting (pc), for example white. In the case of phosphor-converting LEDs, the conversion layer can be directly downstream of the LED exit surface or connected to it. Alternatively, the conversion layer may be spaced from the LED exit surface, for example dome-like arranged above the LED exit surface.

The lamp may also be designed in such a way that the optical element has a variable distance in relation to the light sources and/or can be rotated and/or tilted about its main radiation direction. Consequently, the resulting illumination can be adapted in a targeted manner.

In one embodiment, a reflector associated with the respective light source is disposed between the one or more light sources and the at least one optical element.

Reflectors may thus be assigned to the light sources as primary optics, through whose openings on the input side the light provided by the light sources may be coupled in. This results in an initial beam shaping and/or beam guiding in order to adapt the emitted light to the working range of the line optics. For this purpose, the reflectors may have a parabolic, elliptical, Bezier or free-form shape. The inner surface of the reflectors is specularly reflective, in particular chromium-plated. In addition, the inner surface may be macro- or micro-facetted.

In one embodiment, the lamp has a plurality of light sources arranged in a row, in particular in a plurality of rows, with respect to a plane perpendicular to the direction of radiation.

For example, each three LEDs are arranged next to each other in two rows. The arrangement is in particular mirror-symmetrical, i.e., the LEDs of one row do not have any offset to the LEDs of the other row. By arranging several light sources in several rows, in particular in conjunction with the protruding reflectors, uniform illumination of the line optics can be achieved.

Alternatively or additionally, the lamp has a plurality of light sources that are arranged rotationally symmetrically with respect to an axis extending in the direction of radiation.

For example, six LEDs can form a circular arrangement, with the radiation directions of the LEDs aligned parallel to each other. This may also be used to achieve uniform illumination of the line optics, particularly in conjunction with the aforementioned reflectors.

The rotationally symmetrical arrangement of the light sources may also be combined with an arrangement of the light sources in multiple rows. For example, several rows may comprise groups of rotationally symmetrically arranged light sources. Alternatively or additionally, cross-shaped arrangements of the light sources may also be implemented.

In a further embodiment, the lamp has multiple light sources that can be operated individually or in groups.

For this purpose, the light sources can be grouped, for example, with regard to their respective color, color temperature, power and/or arrangement. Such grouping enables flexible illumination of the line optics, such as with regard to a color or color mixture, color temperature or color temperature distribution, an intensity or even shape. The operation of the groups may include specific parameter setting and/or switching-on and -off of the respective groups.

Aspects and embodiments also relate to the use of an optical element as described above or a lamp formed according to the previous embodiments for a working lamp or auxiliary lamp of a vehicle.

The advantages indicated for the optical element and the lamp are equally applicable to the use for a working lamp or auxiliary lamp of a vehicle.

BRIEF DESCRIPTION OF THE DRAWINGS

There is shown in.

DETAILED DESCRIPTION OF ILLUSTRATIVE OF EMBODIMENTS

Figure 1:
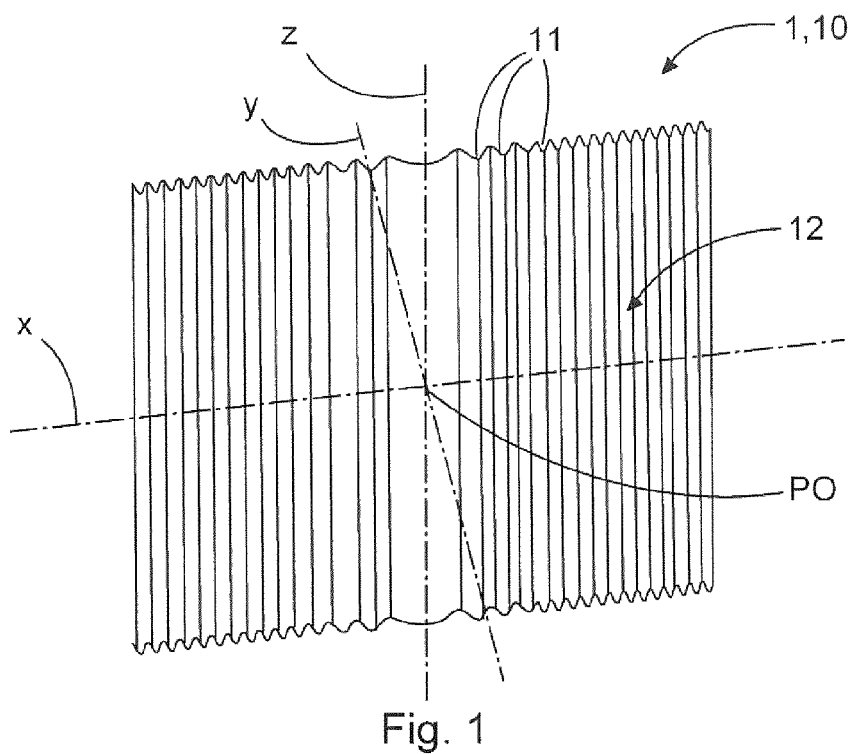
FIG. 1 a perspective view of an optical element according to a first embodiment.

FIG. 1 shows a perspective view of an optical element 1 according to a first embodiment. The optical element 1 is designed as a line optic 10 with a symmetrical groove structure 12 formed by waves 11. The optical element 1 complies here, as in the other embodiments shown, with the line optics in an exemplary manner. The line optic 10 has a rectangular shape and is formed planar both on its side including the groove structure 12 and on the opposite side. The term planar formation of the side including the groove structure 12 is understood in a manner that the groove structure 12 lies in a planar plane. The extension of the line optics 10 in the direction of propagation of the groove structure 12 is preferably about 40 to 200 mm in total.

Starting from a center of symmetry Po, the groove structure 12 varies continuously on both sides in the direction of propagation of the waves 11 which form the groove structure 12. In the embodiment shown in FIG. 1, the direction of propagation of the groove structure 12 corresponds to a direction parallel to the x axis.

Figure 6:
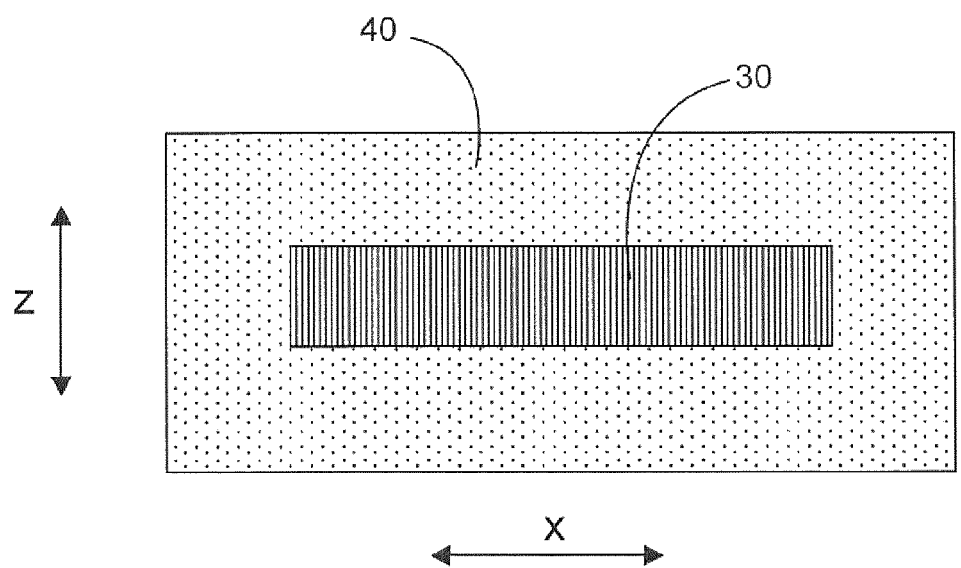
FIG. 6 illumination by an optical element according to FIG. 1 by light sources with and without a reflector.

The optical element 1 not only exhibits symmetry of the groove structure 12 with respect to the center of symmetry Po in the direction of propagation of the groove structure 12, but is also point-symmetrical in a direction perpendicular to the direction of propagation with respect to the axis x. The center of symmetry Po is shown as a single point in FIG. 1, but includes herein any point on this axis with respect to the axis z as the axis of symmetry with respect to the mirror symmetrical configuration of the groove structure 12. There is further shown an axis y extending perpendicularly to the plane spanned by the axes x and z. Accordingly, the groove structure 12 can be plotted with respect to the axes in the direction of axis y over the axis x. The waves 11 forming the groove structure 12 are formed according to the function $f(x)=\cos(s*(x^p))$. The value for x results from the distance to the center of symmetry Po in the direction of propagation of the waves 11, i.e., a direction parallel to the axis x. The value for the scaling s amounts herein preferably 0.50 and for the progression p to 1.6. The optical element 1 can generate a rectangular illumination whose width is parallel to a projection of the axis x and whose height is parallel to a projection of the axis z, so that a line-shaped illumination is formed. For this purpose, FIG. 6 exemplarily shows an illumination 40 by divergent light, i.e., by a light source without a reflector, and an illumination 30 by collimated light, i.e., by light source with a reflector, wherein the illumination 30 reveals a higher intensity. In the direction of propagation of the waves 11, an illumination of 110° can be achieved, which results from a widening of 55° on both sides of the center of symmetry Po.

Figure 2:
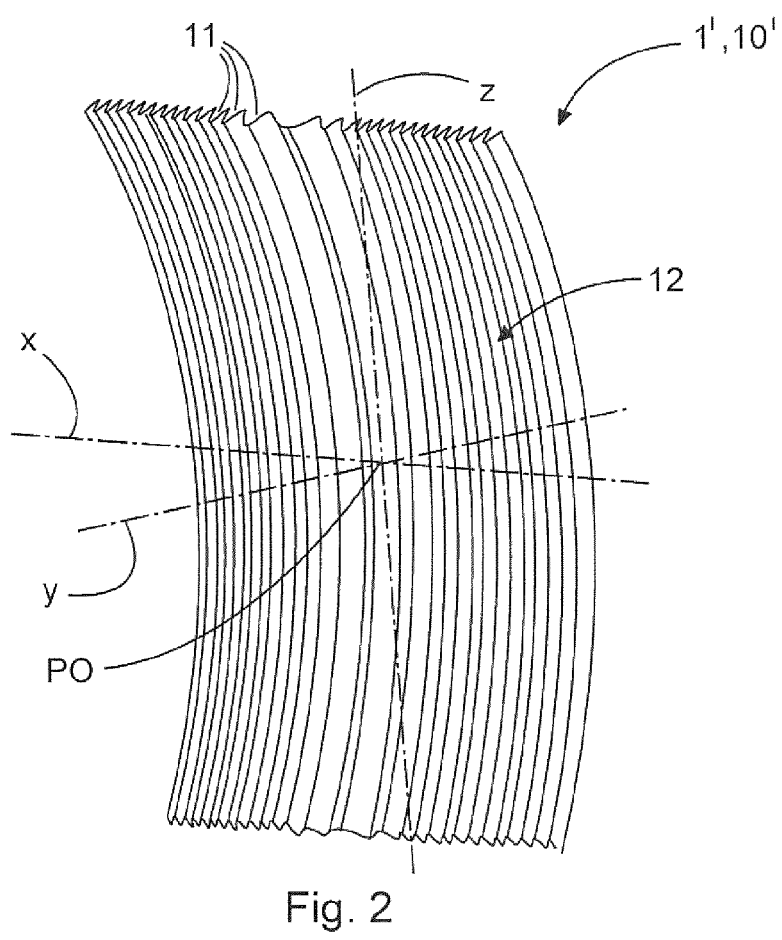
FIG. 2 a perspective view of an optical element according to a second embodiment.

FIG. 2 shows a perspective view of an optical element 1' according to a second embodiment. The optical element 1' of the second embodiment differs from the optical element 1 of the first embodiment by the concave curvature of the optical element 1', or of the line optics 10' about the axis x, i.e., perpendicular to the direction of propagation of the groove structure 12. Accordingly, the line optics 10' is curved inwardly with respect to the side including the groove structure 12. Due to the concave curvature, the radiation penetrating the line optics 10' from the side facing away from the groove structure 12 is focused on a line parallel to the axis x in accordance with the focal length caused by the curvature. At a sufficient distance from the thus formed line focus, the height of the illumination, i.e., its extension parallel to the axis z, may thus be increased at the working distance.

Figure 3:
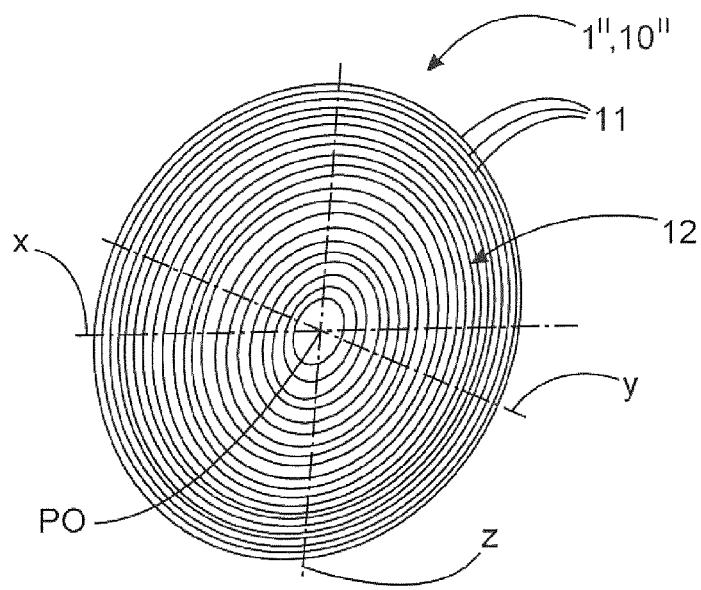
FIG. 3 a perspective view of an optical element according to a third embodiment.

FIG. 3 shows a perspective view of an optical element 1" according to a third embodiment. The optical element 1" or the line optics 10" is rotationally symmetrical. The groove structure 12 extends radially outward from the center of symmetry Po. The center of symmetry is determined here by the axis of rotation, which is formed by the axis y. The waves 11 forming the groove structure 12 are shaped in the same manner at each angle of rotation with respect to the axis y in the radial direction of propagation. Exemplarily, starting from the center of symmetry Po, the groove structure 12 is not formed as a cosine function, but as a sine function, so that the center of symmetry Po is formed from a wave trough.

The rotationally symmetrical design of the line optics 10‴ forms a line-shaped illumination at every angle of rotation, whereby when the line optics 10‴ are radiated through the entire surface, a circular illumination is formed at a working distance due to the superposition of the individual lines.

For radiating through the aforementioned line optics 10, 10′ or 10″, a lamp 2 or 2′ as described with reference to FIG. 4 and FIG. 5 comprises a corresponding optical element 1, 1′ or 1″ and at least one light source 21. The at least one light source 21 passes radiation through the line optics 10, 10′ or 10″ from a side facing away from the groove structure 12.

Figure 4:
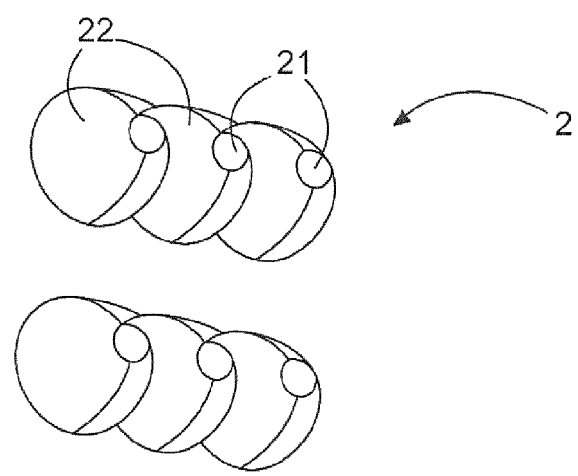
FIG. 4 a perspective view of an light source arrangement for a lamp according to a first embodiment.

FIG. 4 shows, for example, a perspective view of a light source arrangement for a lamp 2 according to a first embodiment. The lamp 2 is not shown here in its entirety, but only the light source arrangement provided for it. This light source arrangement comprises a plurality of light sources 21, which are designed in particular as LEDs, and reflectors 22 which are associated with the respective light sources 21 and surround the light sources 21 on the radiation-emitting side in order to shape and/or guide the emitted radiation. In the illustrated light source arrangement, each three light sources 21 with their respective reflectors 22 are arranged next to each other in two rows, with the emission surfaces of the light sources 21 preferably lying in one plane. In particular, rectangular line optics, such as the line optics 10 or 10′, can be uniformly illuminated via the light source arrangement according to FIG. 4, whereby uniform illumination may also be achieved at the working distance, in particular in peripheral regions in the far field at about 25 m for working lamps or auxiliary lamps of vehicles.

Figure 5:
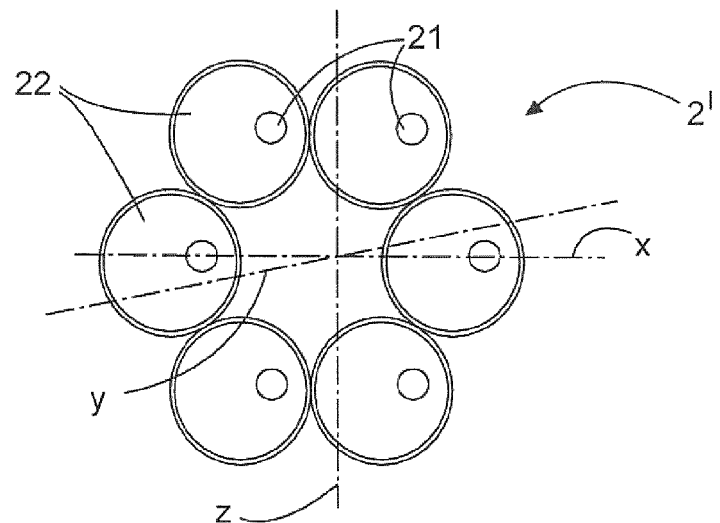
FIG. 5 a perspective view of an light source arrangement for a lamp according to a second embodiment.

FIG. 5 shows a perspective view of a light source arrangement for a lamp 2′ according to a second embodiment. Here, too, the representation of the lamp 2′ is limited to the light source arrangement provided for this purpose. Reflectors 22 are assigned to the light sources 21, which are likewise preferably formed herein by LEDs, on the radiation-emitting side, as in the first embodiment, which shape and/or guide the radiation emitted from the light sources 21. The light sources 21 and their respectively associated reflectors 22 are arranged in a circle around the axis y corresponding to the axis y in FIGS. 1 to 3. The direction of emission of the radiation emitted by the light sources 21 in cooperation with the reflectors is parallel to the axis y here for all light sources 21. The emission surfaces of the light sources 21 herein preferably also lie within one plane. Circular line optics in particular, such as the line optics 10″, may be uniformly illuminated via the light source arrangement according to FIG. 5, whereby uniform illumination can also be achieved at the working distance, in particular in peripheral regions in the far field at about 25 m for working lamps or auxiliary lamps of vehicles.

The light source arrangements of the lamps 2 and 2′ are arranged with respect to the line optics 10, 10′ or 10″ in particular in such a manner that the groove structure 12 is traversed at least at the level of the axis x with a perpendicular angle of incidence. However, the optical elements 1, 1′ or 1″ may also be rotatable about the axis x, the axis y or the axis z, for example, or may be displaced in these directions in order to be able to specifically adapt an illumination at a working distance.

Aspects of the suggestion made herein are not limited to the embodiments and arrangements described. In particular, certain features of one embodiment or arrangement are in principle applicable to other embodiments or arrangements, unless reasonably precluded. Even though the optical elements described in more detail each have a side opposite the groove structure 12 parallel to the plane formed by the groove structure 12, this opposite side can also have variable distances in order to further influence the beam shaping of a light source arrangement. In addition, for example, the groove structure 12 of the line optics 10″ may also be described by a cosine function starting from the center of symmetry Po.

The invention claimed is:

1. An optical element for a lamp, the optical element comprising:
    a line optic having a symmetrical groove structure formed from waves,
    wherein the groove structure varies continuously starting from a center of symmetry in at least one propagation direction of the groove structure,
    wherein the groove structure is formed as a cosine function starting from the center of symmetry in the at least one propagation direction, and
    wherein the waves are formed starting from the center of symmetry according to the function $f(x)=\cos(s*(x\hat{\,}p))$, where x denotes a distance from the center of symmetry, p denotes a progression and s denotes a scaling.

2. The optical element according to claim 1, wherein mutual wave spacings of the waves vary continuously in the at least one propagation direction of the groove structure.

3. The optical element according to claim 1, wherein pitches of the waves vary continuously in the at least one propagation direction of the groove structure.

4. The optical element according to claim 1, wherein radii of crests of the waves and troughs vary continuously from wave to wave of the groove structure.

5. The optical element according to claim 1, wherein the progression is 1.6+/−10%.

6. The optical element according to claim 1, wherein the scaling is 0.50+/−10%.

7. The optical element according to claim 1, wherein the groove structure is formed as a sinusoidal function starting from the center of symmetry in the at least one propagation direction.

8. The optical element according to claim 1, wherein the groove structure is linear or rotationally symmetrical.

9. The optical element according to claim 1, wherein the line optic is planar at least on their side which includes the groove structure.

10. The optical element according to claim 1, wherein the line optic is convex at least on a side which includes the groove structure.

11. The optical element according to claim 1, wherein the line optic is concave at least on a side which includes the groove structure.

12. The optical element according to claim 1, wherein the line optic comprises polymethyl methacrylate or polycarbonate.

13. The lamp comprising:
    at least one optical element according to claim 1; and
    one or more light sources configured to transmit radiation through the line optic from a side facing away from the groove structure.

14. The lamp according to claim 13, further comprising a reflector associated with respective light sources, wherein the reflector is arranged between the one or more light sources and the at least one optical element.

15. The lamp according to claim 13, wherein the lamp comprises a plurality of light sources arranged in a row with respect to a plane perpendicular to a radiation direction.

16. The lamp according to claim 13, wherein the lamp comprises a plurality of light sources arranged rotationally symmetrically with respect to an axis extending in a radiation direction.

17. The lamp according to claim 13, wherein the lamp comprises a plurality of light sources configured to operate individually or in groups.

18. A method comprising:
   using the optical element according to claim 1 as a working lamp or an auxiliary lamp of a vehicle.

* * * * *